United States Patent
Jameson

(10) Patent No.: US 9,879,736 B2
(45) Date of Patent: Jan. 30, 2018

(54) BALL RAMP ACTUATOR RETAINING PLUG

(71) Applicant: Schaeffler Technologies AG & Co. KG, Herzogenaurach (DE)

(72) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 157 days.

(21) Appl. No.: 14/699,205

(22) Filed: Apr. 29, 2015

(65) Prior Publication Data

US 2016/0319890 A1 Nov. 3, 2016

(51) Int. Cl.
*B60P 7/135* (2006.01)
*F16D 23/12* (2006.01)

(52) U.S. Cl.
CPC ........ *F16D 23/12* (2013.01); *F16D 2023/123* (2013.01)

(58) Field of Classification Search
CPC .... B63B 25/24; B60P 7/10; B60P 7/15; B60P 7/16; B60P 7/135; B61D 45/008; B61D 45/006
USPC ............. 410/155, 117, 87; 224/325, 0.5; 248/634, 635; 206/735, 318
See application file for complete search history.

(56) References Cited

U.S. PATENT DOCUMENTS

| 3,701,324 A * | 10/1972 | Pierce | B61D 45/006 410/122 |
| 3,779,173 A * | 12/1973 | Pierce | B61D 45/006 410/122 |
| 5,881,989 A * | 3/1999 | O'Brien | G06F 1/1605 24/297 |
| 6,460,677 B1 | 10/2002 | Roscoe | |
| 2002/0197128 A1* | 12/2002 | Keramidis | B61D 45/006 410/122 |
| 2007/0234676 A1* | 10/2007 | Hejnicki | B60P 3/0252 52/655.1 |

FOREIGN PATENT DOCUMENTS

GB 890484 A * 2/1962 ........... B65D 81/052

* cited by examiner

*Primary Examiner* — H Gutman
(74) *Attorney, Agent, or Firm* — Volpe and Koenig, P.C.

(57) ABSTRACT

A ball ramp plate assembly includes a first ball ramp plate and a second ball ramp plate coaxially aligned so that first and second ball pockets are opposed with rolling elements disposed in the opposing first and second ball pockets. A plug extends through the first ball ramp plate and the second ball ramp plate and engages both ball ramp plates to maintain the first ball ramp plate and the second ball ramp plate against displacement with respect to each other.

18 Claims, 3 Drawing Sheets

US 9,879,736 B2

BALL RAMP ACTUATOR RETAINING PLUG

FIELD OF INVENTION

Embodiments of the present disclosure generally relate to a power transmission apparatus, more particularly to a ball ramp plate assembly including a position-fixing plug.

BACKGROUND

Ball ramp plate actuators are known to include a ball ramp plate assembly having two ball ramp plates, each with ramped ball pockets formed on a face. The plates are coaxially aligned with each other so that the ball pockets in an opposing orientation with a roller ball disposed between opposing ramp pockets. In some cases, it is desirable to maintain a fixed spacing between the ball ramp plates. For example, when shipping ball ramp plate assemblies, the spacing must be maintained within certain limits to contain the roller ball in the opposing ramped pockets until the assembly is installed in an actuator where additional components maintain the correct positioning.

Current methods of fixing the ball ramp plate spacing include retainers to hold the ball ramp plates in place that are removed prior to assembly. However, between removal of the clips and installing the assembly in the actuator, the ball ramp plates may separate and the balls move from the pockets. Additionally, the removed retainer must be handled and disposed of.

Accordingly, a need exists for a ball ramp assembly in which the ball ramp plates can be held in a desired position to contain the balls while the assembly is handled during shipping and throughout the assembly process. A need also exists for a ball plate assembly that can be held in the desired position without a retainer that requires handling and disposal at the ball ramp plate actuator assembly site.

SUMMARY

Embodiments of a ball ramp plate assembly are provided herein. In some embodiments, a ball ramp plate assembly comprises a first ball ramp plate with ramped first ball pockets formed on a first side thereof at a ball ramp pitch radius and a first axial passage formed through the plate. A second ball ramp plate is provided with ramped second ball pockets formed on a first side thereof at the ball ramp pitch radius and a second axial passage formed through the plate. The first ball ramp plate is coaxially aligned with the second ball ramp plate so that the first and second ball pockets are opposed. A plurality of rolling elements is disposed in the opposing first and second ball pockets. A plug is disposed through the first and second axial passages so that a first portion of the plug engages the first ball ramp plate and a second portion of the plug engages the second ball ramp plate. The plug maintains the first ball ramp plate and the second ball ramp plate against displacement with respect to each other.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
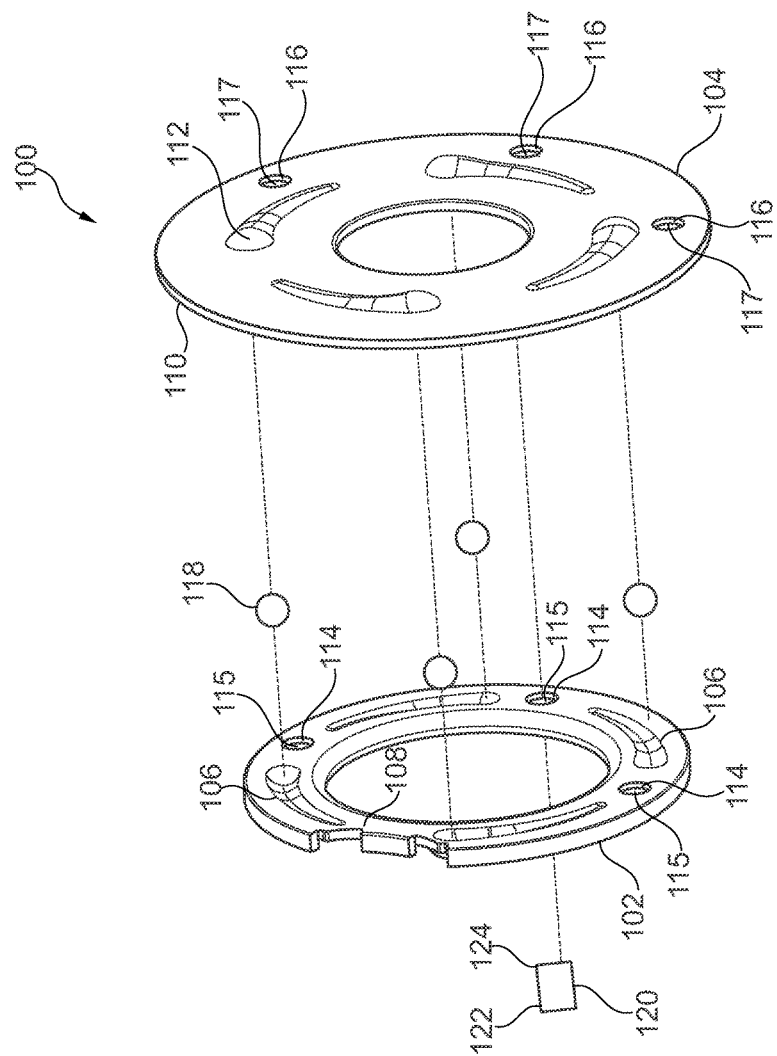
FIG. 1 is an exploded view of a ball ramp plate assembly in accordance with an embodiment.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 is an exploded view of a ball ramp plate assembly 100 in accordance with an embodiment of the disclosure. The assembly comprises first ball ramp plate 102 and second ball ramp plate 104. The first ball ramp plate 102 has first ramped ball pockets 106 formed on a first side 108 and an axial wall 114 forming an axial passage 115 through the first plate 102. The second ball ramp plate 104 has second ramped ball pockets 112 on first side 110 and an axial wall 116 forming an axial passage 117 through the second plate 104. In an embodiment, the axial passages 115 and 117 circular holes with different diameters. In a preferred embodiment, the axial passage 115 in the first plate 102 is larger in diameter than the axial passage 117 in the second plate 104.

In the assembly 100 the first and second ball ramp plates 102, 104 are coaxially aligned so that the first faces 108, 110 are opposed, axial passages 115, 117 are axially aligned, and at least a portion of the first and second ramped ball pockets are aligned. In the preferred embodiment of FIG. 1, each ramped ball pocket pair 106, 112 has one rolling element, ball 118, disposed in the deepest part of the pocket. A plug 120, one shown schematically in FIG. 1, is disposed in the axial passage 115, 117 so that a first portion 122 engages the first plate 102 and a second portion 124 engages the second plate 104. In each case, the respective portions of the plug 200 engage the ball ramp plates 102, 104 by capturing the plate thickness 304, 306 (FIG. 3) between features of the plug. By engaging the first and second plates with first and second portions, respectively, the plug holds the plates against at least one of axial displacement, rotational displacement, and translational displacement with respect to each other.

Figure 2:
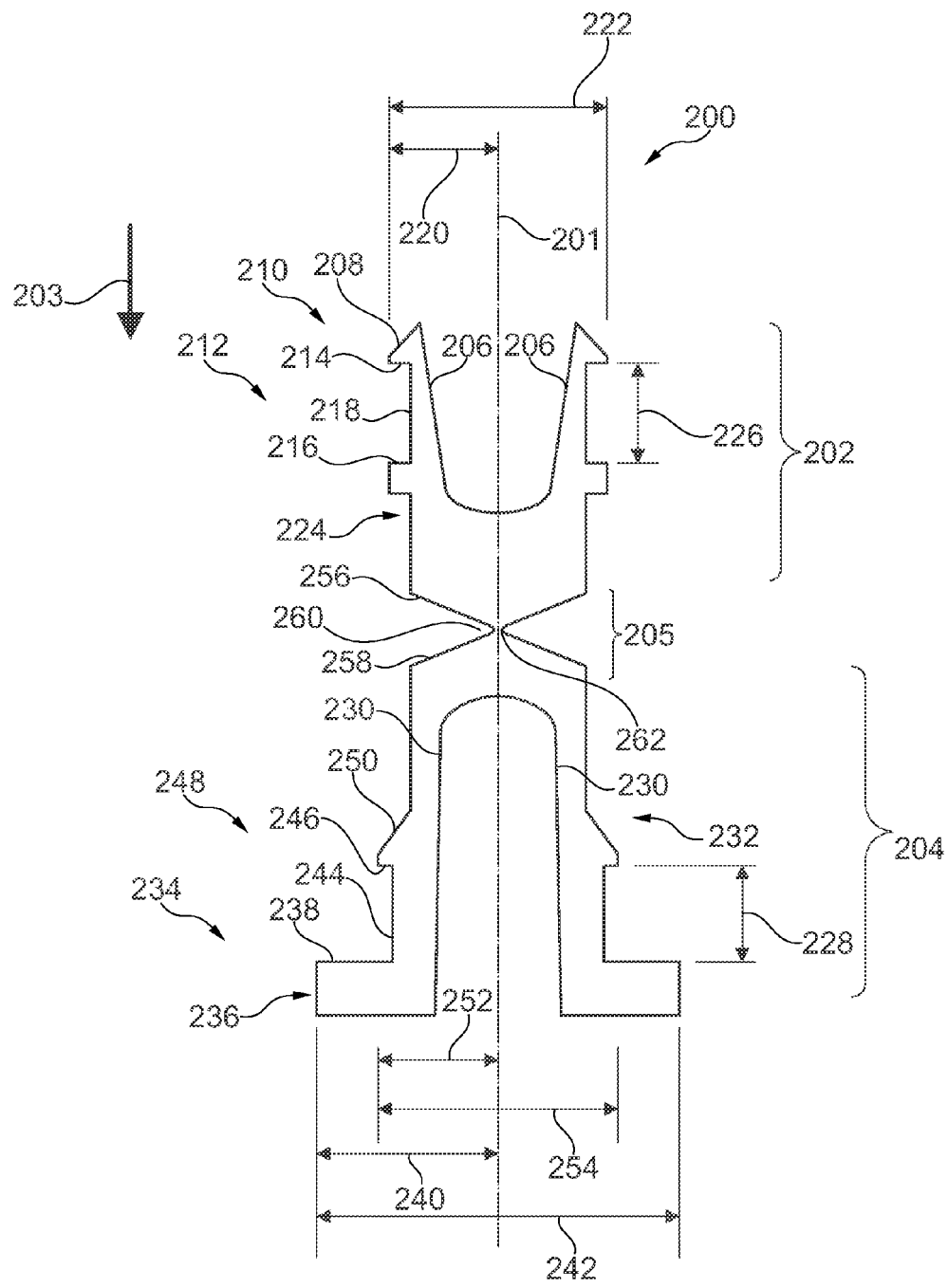
FIG. 2 is a plan view of a plug in accordance with an embodiment.

FIG. 2 shows a non-limiting example of a plug 200 in accordance with an embodiment. The plug 200 includes a leading portion 202 (corresponds with second portion 124 in FIG. 1) joined to a trailing portion 204 (corresponds with first portion 122 in FIG. 1) by middle portion 205. The exemplary plug 200 has a longitudinal axis of symmetry 201. Accordingly, the description of one side also describes the second side.

Leading portion 202 includes at least two fingers 206 (2 shown) laterally spaced from each other with tapered tips 208 at a first end portion 210. The tapered tip 208 laterally expands in direction 203. Reduced width portion 212, comprising first lateral surface 214 and second lateral surface 216 joined by axial surface 218 is formed adjacent to the tapered tip 208 with an axial length 226 between lateral surface 214 and 216. First and second lateral surfaces 214, 216 may terminate laterally at a distance 220 from the axis 201, corresponding with the lateral extent of the leading portion 202 and yielding an overall width of 222 for the leading portion 202. In an embodiment, first lateral surface 214 terminates laterally at a distance less than the lateral distance at which second lateral surface 216 terminates. The fingers 206 are rooted in a body portion 224 in a manner that facilitates and supports flexibility of the fingers, at least inwardly, for example with a radiused transition at a radially inwardly facing portion of the fingers. The fingers 206 extend laterally from the axis 201 no more than distance 220. Lateral surfaces 216 form shoulders extending laterally from the body portion 224 configured (e.g., by size or shape) so that lateral surface 216 cannot pass through passage 117 in second plate 104. Distance 220 is no greater than the diameter of passage 115 so that leading portion 202 can pass through passage 115. The fingers 206 are configured to flex or deflect radially inwardly in response to a force applied in the direction 203 against the tapered tips 208. Collectively, the flexible fingers 206, lateral surfaces 214, 216, and axial surface 218 comprise a non-limiting embodiment of an engagement feature at the leading portion 202 of the plug 200 as these elements engage the thickness 306 of the second plate 104.

In an embodiment, leading portion 202 is a partial cylinder with an outside diameter corresponding to width 222 so that fingers 206 are curved when viewed in and end view in a direction corresponding to 203. In embodiments having two fingers, the fingers are directly, or diametrically, opposed. In embodiments with more than two fingers 206, the fingers are preferably evenly spaced around the diameter of the cylinder. In an embodiment, inwardly facing surfaces of fingers 206 are concave. Tapered tips 208 form a portion of a conical surface with a diameter corresponding to width 222 or less and the radially outward edges of second lateral surface 216 forms an arced shoulder having a radius no greater that 220.

Trailing portion 204 includes at least two fingers 230 (2 shown) rooted in body portion 232 laterally spaced from each other and flexible with respect to the body portion. The fingers 230 are rooted in a body portion 232 in a manner that facilitates and supports flexibility of the fingers, at least inwardly, for example with a radiused transition at a radially inwardly facing portion of the fingers. First end portion 234 of trailing portion 204 terminates in an axial wall 236 bounding radially outwardly extending lateral wall surface 238. Lateral wall 238 terminates at a laterally outermost distance 240 from axis 201 greater than distance 220. Consequentially, overall width 242 of the first end 234 of trailing portion 204 is greater than overall width 222.

Lateral wall surface 238 is joined by axial wall surface 244 with axially spaced lateral wall surface 246 which extends radially outwardly, forming a reduced width area 248 of axial length 228. Lateral wall surface 246 is proximate the middle portion 205 and lateral wall surface 238 is proximate first end 234. The lateral wall surfaces 238 form shoulders extending laterally from the body portion 232 at the first end 234 of the trailing portion 204. The shoulders formed by lateral surfaces 238 are configured (e.g., by size or shape) so that lateral surfaces 238 cannot pass through passage 115 in the first plate 102. Thus, the first end 234 of trailing portion 204 cannot pass through passage 115.

A tapered portion 250 is formed adjacent to the reduced width area 248, opposite from lateral wall 246. Tapered wall portion 250 laterally reduces from 252 to the body 232 in the direction opposite of 203. The fingers 230 are configured to flex or deflect radially inwardly in response to a force applied in the direction of 203 against the tapered wall portion 250. Collectively, the flexible fingers 230, lateral wall surfaces 238, 246, and axial wall surface 244 comprise a non-limiting embodiment of an engagement feature of the trailing portion 204 of the plug 200 as these features engage the thickness 304 of the first plate 102.

Lateral wall surface 246, extends outwardly from axial wall surface 244 to a distance 252 from the axis 201. Distance 252 is less than distance 240, but greater than distance 220. Consequently, the overall width 254 at the tapered portion is greater than width 222 of the leading portion 202. Tapered wall portion 250 terminates at the body portion 232 in a direction opposite 203.

In an embodiment, fingers 230 of trailing portion 204 form part of a cylinder with a maximum outside diameter corresponding to width 254 so that the fingers 230 are curved when viewed in an end view in a direction opposite to 203. In an embodiment, inwardly facing surfaces of fingers 230 are concave. Tapered wall portions 250 form a portion of a conical surface with a diameter corresponding to width 254 tapering to the body portion 232. Axial wall surfaces 236 form an arced shoulder having a radius of 240.

Middle portion 205 is formed between leading and trailing portions 202 and 204 and joins body portion 224 with body portion 232. Body portions 224 and 232 include convergent surfaces 256, 258, respectively, directed toward the axis 201 that intersect spaced from the axis 201. The convergent surfaces 256, 258 form a necked down or reduced cross-sectional area 260 leaving a web 262 joining the body portions 224, 232. The cross-sectional area of the web 262 is reduced from that of both body portions 224, 232. In an embodiment, reduced area 260 includes a web 262 that is cylindrical in cross section and reduced from the cross sectional areas of the body portions 224, 232. Convergent surfaces 256, 258 form conical surfaces terminating at the web 262. In an embodiment, convergent surfaces 256, 258 form an acute angle so that an abrupt transition occurs in the middle portion 206 at either side of the web 262.

Figure 3:
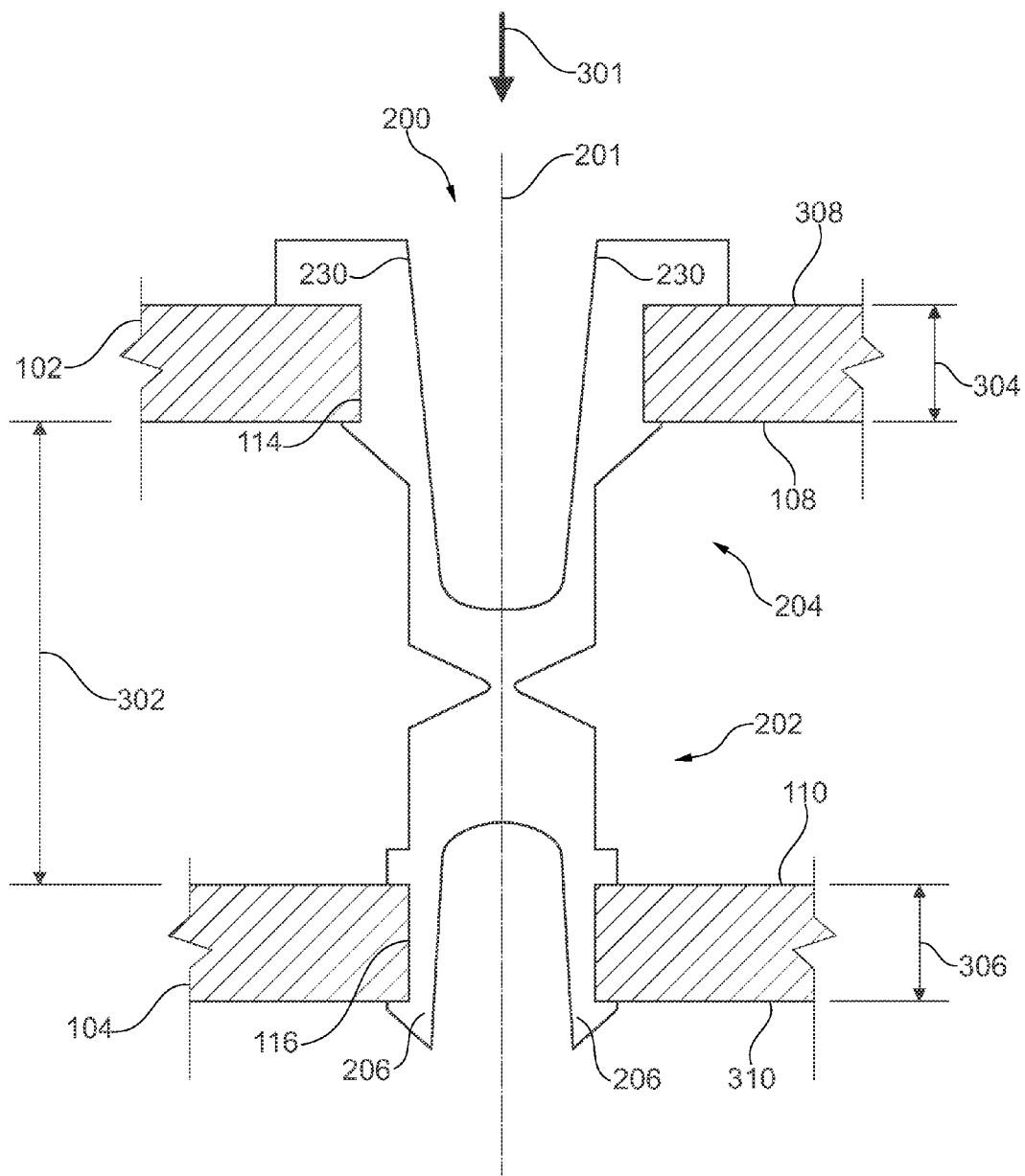
FIG. 3 is a cross-sectional view of a portion of the ball ramp plate assembly of FIG. 1.

FIG. 3 is a cross-sectional view of the ball ramp plate assembly 100 in an assembled condition, the section taken through the non-limiting example of plug 200. First ball ramp plate 102 and second ball ramp plate 104 are spaced apart by an axial distance 302 no greater than the diameter of balls 118 (FIG. 1) and maintained at that spacing by plug 200. In a preferred embodiment, distance 302 is such that the balls 118 remain in the deepest part of each of the ramped ball pockets 106 and 112. For example, the distance 302 may be the difference between the diameter of the balls 118 less the summed maximum depth of the opposed pair of ramped ball pockets (i.e., the ball 118 diameter less the sum of the maximum depth of pocket 106 and the maximum depth of opposing ramped ball pocket 112.)

To maintain the correct spacing in a ball ramp plate assembly 100, the first and second ball ramp plates are coaxially assembled with balls (e.g., the 4 balls shown in FIG. 1) disposed in opposing ramped ball pockets (e.g., 106 and 112, FIG. 1) and at least some axial passages 115, 117, formed by axial walls 114, 116, are coaxially aligned to receive plug 200. The plug 200 is aligned with one pair of aligned axial passages 115, 117 and advanced in direction 301 toward first ball ramp plate 102 with the leading portion 202 aligned with axial passage 115. The plug 200 is sized so that overall width 222 of the leading portion passes through (i.e., is no greater than) the diameter of the passage 115. Leading portion 202 passes through passage 115 with no, or substantially no, interference with axial wall 114.

Plug 200 is further advanced with leading portion 202 directed toward second ball ramp plate 204 aligned with passage 117. Leading portion 202 is formed so that overall width 222 is greater than the diameter of passage 117 formed by axial wall 116 such that the intersection of axial wall 116 and first side 110 of second plate 104 contacts a portion of the tapered tip 208. A portion of tapered wall portion 250 of trailing portion 204 substantially simultaneously contacts the corner formed by axial wall 114 and the second side 308 of first ball ramp plate 102. The overall width 222 of the leading portion 202 is sized to be larger than the diameter of axial passage 115.

With further advancement of the plug 200 after contact, fingers 206 and 230 deflect toward the axis 201, against a bias of the fingers 206, 230, due to the interaction of the tapered portion 208 at the leading portion 202 and tapered wall portion 250 at the trailing portion 204 with the first and second ball ramp plates 102, 104, respectively. The fingers 206 deflect inwardly until the overall width 222 of the leading portion 202 is reduced sufficiently to enter the passage 117. Similarly, the fingers 230 deflect inwardly until the overall width 254 is reduced sufficiently to enter passage 115.

Once within the passages 117, 115, laterally outward terminal ends of tapered portion 208 and tapered wall portion 250 are urged against the axial walls 116 and 114, respectively, by the bias of the fingers 206, 230. Once the plug 200 is advanced so that the first lateral surface 214 extends past second side 310 of the second ball ramp plate 104, fingers 206 spring outwardly due to the bias to return the fingers 206 to the undeflected condition of FIG. 2. Similarly, when lateral wall surface 246 extends past first side 108, fingers 230 spring outwardly due to the bias to return to the undeflected condition of FIG. 2.

The axial length 226 of reduced width portion 212 between lateral walls 214, 216 engages, for example receives and captures, the thickness 306 of second ball ramp plate 104 adjacent to the passage 117 in the reduced width portion 212. The axial length 226 of the reduced width portion 212 may be as great as, or greater than, the thickness 306 adjacent to the second passage 117. Similarly, axial length 228 of reduced width portion 248 engages, or receives and captures, the thickness 304 of first ball ramp plate 102 adjacent to the passage 115 in reduced width area 248. The axial length 228 is as great as, or greater than, the thickness adjacent to the passage 115. Because of the fitting of the thicknesses 306, 304 in the reduced with areas 212, 248 and the bias of the fingers 206, 230 to urge axial surfaces 218, 244 against the axial surfaces 114, 116 of passages 115, 117, the plug 200 secures the ball ramp plates 102, 104 at an axial distance 302 prescribed by the plug 200. In a preferred embodiment, the axial distance between lateral surfaces 214 and 238 of the plug 200 corresponds with the prescribed axial distance 302 plus the plate thicknesses 304, 306, so that the surfaces 108, 110 of the plates 102, 104 maintain the balls 118 in the respective ramp ball pockets 106, 112. The plug 200 may also secure the ball ramp plates 102, 104 in one or more of a rotational or a translational position with respect to each other.

A ball ramp plate assembly 100 thus secured with two or more plugs 200 can be shipped and installed without the possibility of the balls 118 becoming dislodged from the ramped ball pockets 106. The plugs may maintain one or more of the axial positioning (e.g., axial distance 302), the angular, or rotational, positioning, and the translational positioning of the plates from the point of manufacture of the assembly 100 to installation.

Advantageously, the plugs 200 do not require removal from the assembly once installed in, for example, a transfer case. The plugs are preferably made from a material, for example a resin or plastic (e.g., a polymer), and formed with a suitably sized web 262, so that upon the first actuation of the ball ramp plate assembly 100, the web 262 fractures and the leading portion 202 and trailing portion 204 remain within the respective ball ramp plates 104, 102, respectively. The material from which the plugs are made is preferably chosen to have suitable mechanical characteristics so that any incidental contact between the leading portion 202 with the trailing portion 204 during subsequent actuations will not interfere with the performance of the ball ramp plate assembly 100. The material is preferably chosen so that any chips that may be generated during initial or subsequent actuation will have little or no impact on the performance of the ball ramp plate assembly 100.

The non-limiting embodiment of plug 200 is shown and described as a flat element for ease of illustration and description only. Other configurations for the plug would be apparent to an ordinarily skilled artisan.

Thus a ball ramp plate assembly in which the ball ramp plates can be held in a desired position to contain the balls while the assembly is handled during shipping and throughout the assembly process is provided herein. The disclosed assembly advantageously allows shipping and handling of a ball ramp plate assembly without the balls becoming dislodged. Further, the disclosed assembly eliminates the step of removing a clip or fastener at the point of assembly, and the resultant handling and disposal of the clip. Accordingly, installation of the disclosed ball ramp plate assembly may be advantageously impacted by eliminating, or substantially reducing, special handling of the assembly, thereby improving manufacturing throughput.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A ball ramp plate assembly comprising:
a first ball ramp plate with ramped first ball pockets formed on a first side thereof at a ball ramp pitch radius and a first axial passage formed through the plate;
a second ball ramp plate with ramped second ball pockets formed on a first side thereof at the ball ramp pitch radius and a second axial passage, smaller than the first axial passage, formed through the plate, the first ball ramp plate coaxially aligned with the second ball ramp plate so that the first and second ball pockets are opposed, and the first and second axial passages are coaxially aligned;
a plurality of rolling elements disposed in the opposing first and second ball pockets; and
a plug disposed in the first and second axial passages so that a first portion of the plug engages the first ball ramp plate and a second portion of the plug engages the second ball ramp plate to maintain the first ball ramp plate and the second ball ramp plate at an axial spacing,
wherein the second portion of the plug is configured to pass through the first axial passage.

2. A ball ramp plate assembly comprising:
a first ball ramp plate with ramped first ball pockets formed on a first side thereof at a ball ramp pitch radius and a first axial passage formed through the plate;
a second ball ramp plate with ramped second ball pockets formed on a first side thereof at the ball ramp pitch radius and a second axial passage, smaller than the first axial passage, formed through the plate, the first ball ramp plate coaxially aligned with the second ball ramp plate so that the first and second ball pockets are opposed, and the first and second axial passages are coaxially aligned;
a plurality of rolling elements disposed in the opposing first and second ball pockets; and
a plug disposed in the first and second axial passages so that a first portion of the plug engages the first ball ramp plate and a second portion of the plug engages the second ball ramp plate to maintain the first ball ramp plate and the second ball ramp plate at an axial spacing,
wherein the first axial passage and the second axial passage are circular and the first axial passage is larger in diameter than the second axial passage.

3. The assembly of claim 1, wherein the plug restricts axial displacement of one of the first ball ramp plate and the second ball ramp plate away from the other of the first ball ramp plate and the second ball ramp plate beyond the axial spacing.

4. The assembly of claim 1, wherein the axial spacing contains the plurality of rolling elements in opposed first and second ball pockets.

5. The assembly of claim 1, wherein the first portion comprises a first engagement feature to engage the first side and an opposite second side of the first ball ramp plate and the second portion comprises a second engagement feature to engage the first side and an opposite second side of the second ball ramp plate.

6. The assembly of claim 5, wherein the first engagement feature comprises lateral wall surfaces extending from the first portion of the plug.

7. The assembly of claim 5, wherein the second engagement feature comprises lateral wall surfaces extending from the second portion of the plug.

8. A ball ramp plate assembly comprising:
a first ball ramp plate with ramped first ball pockets formed on a first side thereof at a ball ramp pitch radius and a first axial passage formed through the plate;
a second ball ramp plate with ramped second ball pockets formed on a first side thereof at the ball ramp pitch radius and a second axial passage, smaller than the first axial passage, formed through the plate, the first ball ramp plate coaxially aligned with the second ball ramp plate so that the first and second ball pockets are opposed, and the first and second axial passages are coaxially aligned;
a plurality of rolling elements disposed in the opposing first and second ball pockets; and
a plug disposed in the first and second axial passages so that a first portion of the plug engages the first ball ramp plate and a second portion of the plug engages the second ball ramp plate to maintain the first ball ramp plate and the second ball ramp plate at an axial spacing,
wherein the plug comprises a reduced cross-sectional area along a length of the plug between the first portion and the second portion, and
wherein the reduced cross-sectional area is configured to fracture when there is rotational displacement between the first ball ramp plate and the second plate during a first engagement of the ball ramp plate assembly.

9. The assembly of claim 1, wherein the first portion, the second portion, or both the first portion and the second portion are formed as a partial cylinder.

10. The assembly of claim 1, wherein the plug is formed from a polymer.

11. A ball ramp plate assembly comprising:
a first ball ramp plate with ramped first ball pockets formed on a first side thereof at a ball ramp pitch radius and a first axial passage formed through the plate;
a second ball ramp plate with ramped second ball pockets formed on a first side thereof at the ball ramp pitch radius and a second axial passage, smaller than the first axial passage, formed through the plate, the first ball ramp plate coaxially aligned with the second ball ramp plate so that the first and second ball pockets are opposed, and the first and second axial passages are coaxially aligned;
a plurality of rolling elements disposed in the opposing first and second ball pockets; and
a plug disposed in the first and second axial passages so that a first portion of the plug engages the first ball ramp plate and a second portion of the plug engages the second ball ramp plate to maintain the first ball ramp plate and the second ball ramp plate at an axial spacing,
wherein:
the first portion of the plug comprises:
flexible fingers having axially spaced lateral walls joined by an axial wall forming a first reduced width area, wherein the axially spaced lateral walls receive a thickness of the first ball ramp plate adjacent to the first axial passage; and
the second portion of the plug comprises:
flexible fingers having axially spaced lateral walls joined by an axial wall forming a second reduced width area, wherein the axially spaced lateral walls receive a thickness of the second ball ramp plate adjacent to the second axial passage.

12. The assembly of claim 11, wherein the reduced width area is no wider than a diameter of the first axial passage.

13. The assembly of claim 11, wherein the reduced width area is no wider than a diameter of the second axial passage.

14. The assembly of claim 11, wherein the flexible fingers of the first portion of the plug comprise a tapered wall portion, wherein the tapered wall portion expands in a direction opposite of the second portion.

15. The assembly of claim 11, wherein the flexible fingers of the second portion of the plug comprise a tapered tip at a first end portion, wherein the tapered tip laterally expands in an axial direction of the first portion.

16. The assembly of claim 11, wherein the lateral walls of the second portion are configured to pass through the first axial passage.

17. The assembly of claim 11, wherein one of the axially spaced lateral walls of the first portion is formed at a first end of the first portion and configured to not pass through the first axial passage.

18. The assembly of claim 11, wherein the flexible fingers of the first portion, the flexible fingers of the second portion, or both the flexible fingers of the first and second portions are formed as a partial cylinder.

* * * * *